United States Patent
Liu et al.

(10) Patent No.: US 10,136,379 B2
(45) Date of Patent: Nov. 20, 2018

(54) METHOD AND DEVICE FOR PROCESSING NETWORK ACCESS, AND NETWORK ACCESS METHOD AND DEVICE

(71) Applicant: ZTE Corporation, Shenzhen (CN)

(72) Inventors: Wenhao Liu, Shenzhen (CN); Senbao Guo, Shenzhen (CN); Zhaohua Lu, Shenzhen (CN); Feng Bi, Shenzhen (CN)

(73) Assignee: SHANGHAI ZHONGXING SOFTWARE COMPANY LIMITED, Shanghai (CN)

( * ) Notice: Subject to any disclaimer, the term of this patent is extended or adjusted under 35 U.S.C. 154(b) by 0 days.

(21) Appl. No.: 15/534,610

(22) PCT Filed: Dec. 30, 2015

(86) PCT No.: PCT/CN2015/099860
§ 371 (c)(1),
(2) Date: Jun. 9, 2017

(87) PCT Pub. No.: WO2016/091223
PCT Pub. Date: Jun. 16, 2016

(65) Prior Publication Data
US 2017/0367030 A1    Dec. 21, 2017

(30) Foreign Application Priority Data
Dec. 9, 2014    (CN) .......................... 2014 1 0751130

(51) Int. Cl.
*H04W 48/02*    (2009.01)
*H04W 36/38*    (2009.01)
(Continued)

(52) U.S. Cl.
CPC .......... *H04W 48/02* (2013.01); *H04W 36/38* (2013.01); *H04W 74/004* (2013.01); *H04W 74/006* (2013.01); *H04W 74/04* (2013.01)

(58) Field of Classification Search
CPC .......................... H04W 48/02; H04W 74/002
(Continued)

(56) References Cited

U.S. PATENT DOCUMENTS

2009/0175161 A1   7/2009   Yi
2011/0096687 A1*  4/2011   Dottling ................ H04W 24/02
                                                        370/252
(Continued)

FOREIGN PATENT DOCUMENTS

CN   104734761 A    6/2015
WO   2013169035 A1  11/2013
WO   2014104758 A1   7/2014

OTHER PUBLICATIONS

International Search Report for corresponding application PCT/CN2015/099860 filed on Dec. 30, 2015; dated Apr. 5, 2016.

*Primary Examiner* — John J Lee
(74) *Attorney, Agent, or Firm* — Cantor Colburn LLP

(57) ABSTRACT

Provided are a method and device for processing a network access, and a network access method and device. The processing method includes: acquiring resource configuration information of an access signal group, the resource configuration information including: a sending resource required by a terminal for sending an access signal on a resource corresponding to the access signal group, and an access response resource corresponding to the access signal group, the access signal being used for accessing a network, the access response resource being used for indicating a resource used by a sending device of the access signal when (Continued)

receiving a response signal of the access signal; and notifying the terminal of the resource configuration information.

19 Claims, 11 Drawing Sheets

(51) Int. Cl.
*H04W 74/00* (2009.01)
*H04W 74/04* (2009.01)

(58) Field of Classification Search
USPC .............................. 455/515, 434, 509, 452.1
See application file for complete search history.

(56) References Cited

U.S. PATENT DOCUMENTS

| | | | | |
|---|---|---|---|---|
| 2013/0301567 A1* | 11/2013 | Jeong | ................ | H04W 74/0833 |
| | | | | 370/329 |
| 2015/0003391 A1* | 1/2015 | Chen | .................... | H04L 5/0092 |
| | | | | 370/329 |
| 2015/0163730 A1* | 6/2015 | Zhang | ................... | H04W 48/16 |
| | | | | 370/329 |

* cited by examiner

METHOD AND DEVICE FOR PROCESSING NETWORK ACCESS, AND NETWORK ACCESS METHOD AND DEVICE

TECHNICAL FIELD

The present disclosure relates to the field of communications, and more particularly to a method and device for processing a network access, and a network access method and device.

BACKGROUND

With the continuing development of the radio technology, the popularization of various smart terminals and the increase of data services, mobile communication traffic volumes will be doubled annually in future, Mobile and wireless communications Enablers for the 2020 Information Society (METIS) make a prediction about 5G traffic that data services will be increased by 1000 times in future ten years.

A 4G system has adopted these technologies, such as Orthogonal Frequency-Division Multiplexing (OFDM), Multiple Input Multiple Output (MIMO), Multi-User MIMO (MU-MIMO) and Hybrid Automatic Repeat Request (HARQ) to improve the spectral efficiency of a cell, and the system capacity of a certain region is improved by means of a smaller cell technology. However, these technologies are insufficient for exponential increase of data volumes. In addition, almost all of the current mobile communications systems adopt a band ranging from 300 MHz to 3 GHz, huge spectral resources within the range of 3 GHz to 300 GHz are not utilized, and in order to achieve high-throughput service transmission, not only the spectral efficiency and the cell density are improved, but also these new large-bandwidth spectral resources must be utilized. It is necessary to take it into consideration that a cell network utilizes these spectra in a next-generation evolution process to improve the throughput of a wireless network.

Millimeter wave communications have a great path loss, and therefore it is necessary to adopt a high-directionality antenna. On a millimeter wave frequency, the high-directionality antenna may be smaller and more compact. Accurate beam forming plays an important role in establishment of a high-band communication link. Therefore, a method and device for establishing a link by utilizing a high-directionality antenna are needed.

In the related art, provided are two processing solutions: (1) during identification of an uplink preferable receiving beam and an uplink preferable transmitting beam, the problems where a base station cannot respond to more uplink accesses due to increase of access process overheads if a terminal has a multi-beam transmitting capability and the base station cannot identify whether these uplink accesses come from the same communication node are caused; and (2) an access signal group is used to identify whether access signals come from the same terminal, but implementation of the terminal will be disordered due to no definition of behaviors of the terminal.

Any effective solution has not been proposed yet at present for the above-mentioned problems in the related art.

SUMMARY

The embodiments of the present disclosure provide a method and device for processing a network access, and a network access method and device, which are used to at least solve the technical problems in the related art where a network access process is disordered due to the fact that behaviors of a terminal cannot be defined.

According to an embodiment of the present disclosure, a method for processing a network access is provided, which may include: acquiring resource configuration information of an access signal group, the resource configuration information including: a sending resource required by a terminal for sending an access signal on a resource corresponding to the access signal group, and an access response resource corresponding to the access signal group, the access signal being used for accessing a network, the access response resource being used for indicating a resource used by a sending device of the access signal when receiving a response signal of the access signal; and notifying the terminal of the resource configuration information.

In certain embodiments, the sending resource may include at least one of the following: a sending time resource, a sending sequence and a sending frequency resource.

In certain embodiments, the sending time resource may include at least one of the following: an initial position of the access signal group, indicating information for indicating a duration time of the access signal group, and a sending period of the access signal group.

In certain embodiments, the indicating information may include: a duration time and a duration time grade, different duration time grades corresponding to different duration times.

In certain embodiments, the duration time may be an integral multiple of time needed by transmission of a data elementary unit.

In certain embodiments, the duration time may be an integral multiple of 0.1 ms.

In certain embodiments, the duration time grade may include: $2^n$ duration time grades, n being an integer.

In certain embodiments, the sending frequency resource may include: a frequency domain initial position and a frequency domain continuous bandwidth.

In certain embodiments, the access response resource corresponding to the access signal group may include at least one of the following: an access response resource corresponding to a sending resource of an access signal, and an access response resource corresponding to sending resources of multiple access signals.

In certain embodiments, when sending resources of multiple access signals correspond to an access response resource, each access response resource may correspond to only a sending resource of an access signal, or each access response resource may correspond to sending resources of multiple access signals.

In certain embodiments, if multiple access signal resources correspond to an access response resource and each access response resource corresponds to sending resources of multiple access signals, network access quality indicating information may be carried in response signals of the access signals.

In certain embodiments, notifying the terminal of the resource configuration information may include at least one of the following:

a network node having been connected to the terminal notifies the terminal of the indicating information through a high-layer signaling;

a network node to be accessed by the terminal broadcasts the resource configuration information through a broadcast channel;

a specified terminal having been connected to the network notifies the terminal of the resource configuration information; and the terminal is pre-configured with the resource configuration information, the pre-configured resource configuration information being resource configuration information pre-appointed between a sender and a receiver of the access signal.

In certain embodiments, the access response resource corresponding to the access signal group may include one of the following: sending, when receiving some access signals in an access signal group, an access response of the access signal group; and sending, when receiving all access signals in an access signal group, an access response of the access signal group.

In certain embodiments, the sending resource may include: a mode of sending, by the terminal, an access signal on a resource corresponding to an access signal group, the mode of sending an access signal including: limiting, for the same access signal group, the terminal to maintain a transmission direction in a process of sending an access signal in the access signal group, or limiting the terminal to switch different transmission directions in a process of sending an access signal in the access signal group.

According to another embodiment of the present disclosure, a network access method is provided, which may include: a terminal acquires resource configuration information of an access signal group, the resource configuration information including: a sending resource required by the terminal for sending an access signal on a resource corresponding to the access signal group, and an access response resource corresponding to the access signal group, the access signal being used for accessing a network, the access response resource being used for indicating a resource occupied by a receiving device of the access signal when sending a response signal of the access signal; the terminal selects the access signal group according to a preset rule, and sends the access signal on a sending resource corresponding to the selected access signal group; and the terminal receives an access response message sent by an access network on an access response resource corresponding to the selected access signal group.

In certain embodiments, the step that the terminal selects the access signal group according to a preset rule may include: the terminal selects the access signal group according to measured channel quality and a beam capability of the terminal.

In certain embodiments, the step that the terminal selects the access signal group according to a measured channel condition and a beam capability of the terminal may include:

when the channel quality is greater than a preset threshold, the terminal selects an access signal group containing few access signals;

when the channel quality is smaller than a preset threshold, the terminal selects an access signal group containing many access signals; and when the terminal has a multi-beam simultaneous transmitting capability, the terminal selects multiple access signal groups to be sent.

In certain embodiments, the sending resource may include: a mode of sending, by the terminal, an access signal on a resource corresponding to an access signal group. The step that the terminal sends the access signal on a sending resource corresponding to the selected access signal group may include: the terminal sends the access signal according to a beam switching mode defined by the sending resource.

In certain embodiments, the beam switching mode defined by the sending resource may include: limiting, for the same access signal group, the terminal to maintain a transmission direction in a process of sending an access signal in the access signal group, or limiting the terminal to switch different transmission directions in a process of sending an access signal in the access signal group.

In certain embodiments, the step that a terminal acquires resource configuration information of an access signal group may include one of the following:

the terminal receives a broadcast of a to-be-accessed node, and reads the resource configuration information in the broadcast;

the terminal acquires the resource configuration information from a high-layer signaling of a connected node;

the terminal acquires the resource configuration information from a notification message of a connected terminal; and the terminal acquires the resource configuration information from pre-configurations.

According to a further embodiment of the present disclosure, a device for processing a network access is provided, which may include: an acquisition module, configured to acquire resource configuration information of an access signal group, the resource configuration information comprising: a sending resource required by a terminal for sending an access signal on a resource corresponding to the access signal group, and an access response resource corresponding to the access signal group, the access signal being used for accessing a network, the access response resource being used for indicating a resource occupied by a receiving device of the access signal when sending a response signal of the access signal; and a notification module, configured to notify the terminal of the resource configuration information.

According to a yet further embodiment of the present disclosure, a network access device is provided, which may be used in a terminal and may include: an acquisition module, configured to acquire resource configuration information of an access signal group, the resource configuration information including: a sending resource required by the terminal for sending an access signal on a resource corresponding to the access signal group, and an access response resource corresponding to the access signal group, the access signal being used for accessing a network, the access response resource being used for indicating a resource occupied by a receiving device of the access signal when sending a response signal of the access signal; a selection module, configured to select the access signal group according to a preset rule; and a transceiver module, configured to send the access signal on a sending resource corresponding to the access signal group selected by the selection module, and receive an access response message sent by an access network on an access response resource corresponding to the selected access signal group.

By means of the present disclosure, in a technical means of notifying a terminal of resource configuration information, the technical problems in the related art where a network access process is disordered due to the fact that behaviors of a terminal cannot be defined are solved, thus improving the stability of a network access process and increasing an access speed.

BRIEF DESCRIPTION OF THE DRAWINGS

The drawings described herein are adopted to provide further understanding of the present disclosure, and form a part of the present application. The schematic embodiments and description of the present disclosure are adopted to explain the present disclosure.

DETAILED DESCRIPTION OF THE EMBODIMENTS

The present disclosure will be illustrated hereinbelow with reference to the drawings and in conjunction with the embodiments in detail. It is important to note that embodiments in the present application and features in the embodiments may be combined under the condition of no conflicts.

Figure 1:
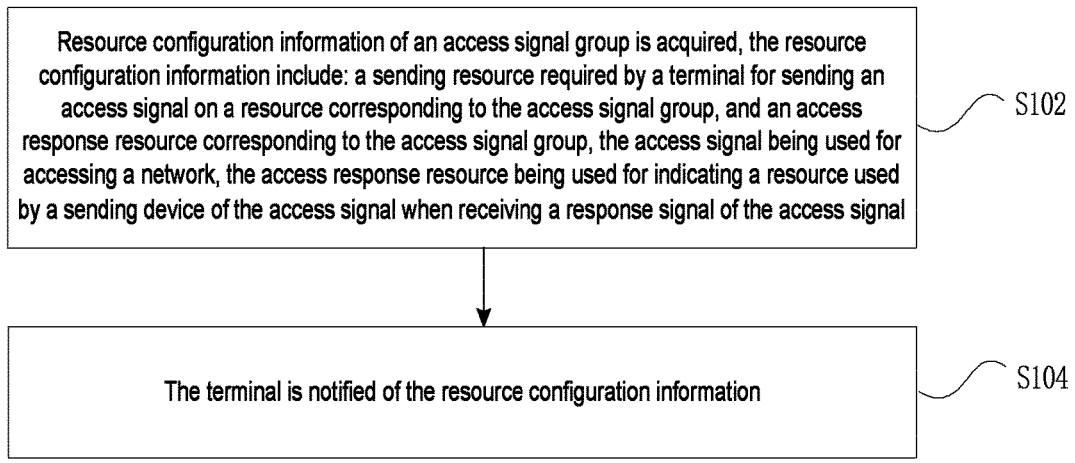
FIG. 1 is a flowchart of a method for processing a network access according to an embodiment of the present disclosure.

FIG. 1 is a flowchart of a method for processing a network access according to an embodiment of the present disclosure. As shown in FIG. 1, the method for processing a network access provided in the embodiment of the present disclosure includes Step S102 to Step S104.

At step S102, resource configuration information of an access signal group is acquired, the resource configuration information including: a sending resource required by a terminal for sending an access signal on a resource corresponding to the access signal group, and an access response resource corresponding to the access signal group, the access signal being used for accessing a network, the access response resource being used for indicating a resource used by a sending device of the access signal when receiving a response signal of the access signal.

At step S104, the terminal is notified of the resource configuration information.

By means of each of the above-mentioned processing steps, the terminal may be notified of the resource configuration information of the access signal group. Therefore, the terminal may send and receive a message according to the resource configuration information, thus limiting behaviors of the terminal. The technical problems where a network access process is disordered due to the fact that the behaviors of the terminal cannot be defined are avoided, thus improving the stability of a network access process and increasing an access speed.

In an exemplary embodiment, the sending resource includes, but is not limited to, at least one of the following: a sending time resource, a sending sequence and a sending frequency resource. The sending time resource may include, but is not limited to, at least one of the following: an initial position of the access signal group, indicating information for indicating a duration time of the access signal group, and a sending period of the access signal group. The sending frequency resource may include, but is not limited to, a frequency domain initial position and a frequency domain continuous bandwidth, and the frequency domain continuous bandwidth includes: data bearer elementary frequency domain units or an aggregate thereof; and/or resource allocation elementary frequency domain units or an aggregate thereof.

The indicating information for indicating the duration time of the access signal group includes, but is not limited to, a duration time and a duration time grade, different duration time grades corresponding to different duration times.

The duration time is an integral multiple of time needed by transmission of a data elementary unit. Data of the data elementary unit is data bearer elementary units or an aggregate thereof, and/or resource allocation elementary units or an aggregate thereof.

In another preferable embodiment, the duration time is an integral multiple of 0.1 ms, and an 'integer' in the 'integral multiple' may be 1, 2, 3, . . . , n, n being a natural number.

In an exemplary embodiment of the present disclosure, the duration time grade includes: $2^n$ duration time grades, n being an integer.

The access response resource corresponding to the access signal group includes at least one of the following: an access response resource corresponding to a sending resource of an access signal, and an access response resource corresponding to sending resources of multiple access signals.

When sending resources of multiple access signals correspond to an access response resource, each access response resource corresponds to only a sending resource of an access signal, or each access response resource corresponds to sending resources of multiple access signals.

If multiple access signal resources correspond to an access response resource and each access response resource corresponds to sending resources of multiple access signals, network access quality indicating information is carried in response signals of the access signals. The network access quality indicating information may be carried in, not limited to, a specified field in the response signal. The quality indicating information may indicate the quality of an access beam, and the terminal may determine a preferable beam according to quality information.

There are many implementation modes of Step S104. For example, the terminal is notified of the resource configuration information in one of the following modes:

(1) a network node having been connected to the terminal notifies the terminal of the indicating information through a high-layer signaling;

(2) a network node to be accessed by the terminal broadcasts the resource allocation information through a broadcast channel;

(3) a specified terminal having been connected to the network notifies the terminal of the resource allocation information; and (4) the terminal is pre-configured with the resource allocation information, the pre-configured resource allocation information being resource allocation information pre-appointed between a sender and a receiver of the access signal.

The access response resource corresponding to the access signal group may be presented as one of the following forms: sending, when receiving some access signals in an access signal group, an access response of the access signal group in order to perform network access on the terminal as soon as possible; and sending, when receiving all access signals in an access signal group, an access response of the access signal group in order to reduce scheduling overheads and alleviate loads.

The sending resource includes: a mode of sending, by the terminal, an access signal on a resource corresponding to an access signal group, the mode of sending an access signal including: limiting, for the same access signal group, the terminal to maintain a transmission direction in a process of sending an access signal in the access signal group, or limiting the terminal to switch different transmission directions in a process of sending an access signal in the access signal group.

Figure 2:
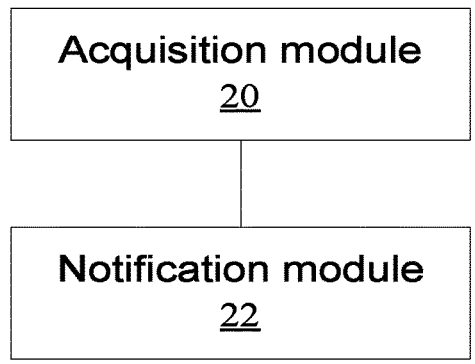
FIG. 2 is a block diagram of a device for processing a network access according to an embodiment of the present disclosure.

The embodiment of the present disclosure also provides a device for processing a network access. As shown in FIG. 2, the device includes an acquisition module 20 and a notification module 22.

The acquisition module 20 is configured to acquire resource configuration information of an access signal group, the resource configuration information comprising: a sending resource required by a terminal for sending an access signal on a resource corresponding to the access signal group, and an access response resource corresponding to the access signal group, the access signal being used for accessing a network, the access response resource being used for indicating a resource occupied by a receiving device of the access signal when sending a response signal of the access signal.

The notification module 22 is connected to the acquisition module 20, and is configured to notify the terminal of the resource allocation information.

By means of functions achieved by each of the above-mentioned modes, behaviors of the terminal may be defined likewise, thus avoiding the technical problems where a network access process is disordered.

It is important to note that each of the above-mentioned modules may be implemented by software or hardware. The modules are implemented by the hardware in, but not limited to, the following modes: the acquisition module 20 and the notification module 22 are located in the same processor; or, the acquisition module 20 and the notification module 22 are located in a first processor and a second processor respectively.

Figure 3:
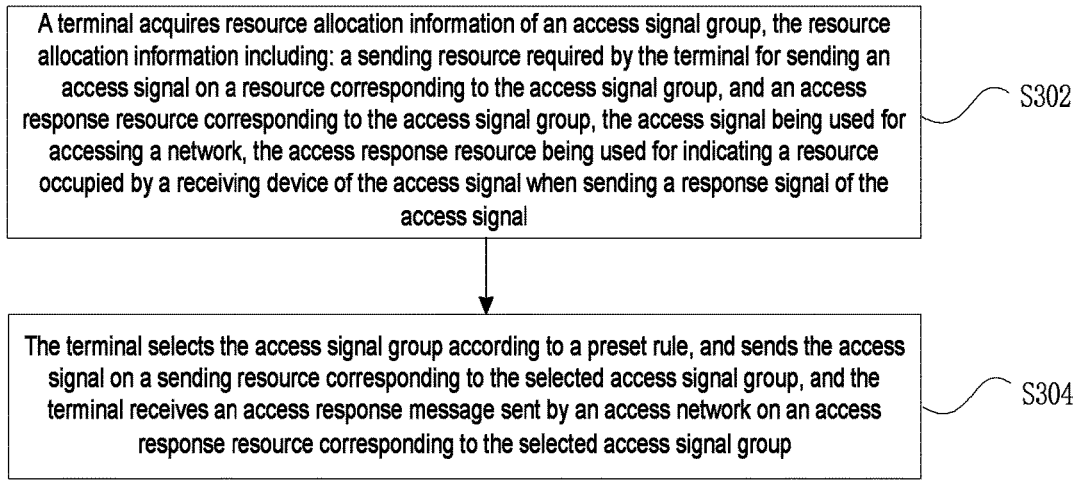
FIG. 3 is a flowchart of a network access method according to an embodiment of the present disclosure.

In the embodiment of the present disclosure, a network access method is provided from a terminal side. As shown in FIG. 3, the method includes the following processing steps S302 to S304.

At step S302, a terminal acquires resource allocation information of an access signal group, the resource allocation information including: a sending resource required by the terminal for sending an access signal on a resource corresponding to the access signal group, and an access response resource corresponding to the access signal group, the access signal being used for accessing a network, the access response resource being used for indicating a resource occupied by a receiving device of the access signal when sending a response signal of the access signal.

At step S304, the terminal selects the access signal group according to a preset rule, and sends the access signal on a sending resource corresponding to the selected access signal group, and the terminal receives an access response message sent by an access network on an access response resource corresponding to the selected access signal group.

By means of the above-mentioned processing steps, the terminal may select the access signal group according to the resource configuration information of the access signal group and may send and receive information on the sending resource thereof. Therefore, behaviors of the terminal may be restricted.

Step S304 may be implemented in, but not limited to, the following modes: the terminal selects the access signal group according to measured channel quality and a beam capability of the terminal. Specifically, when the channel quality is greater than a preset threshold, the terminal selects an access signal group containing few access signals; when the channel quality is smaller than a preset threshold, the terminal selects an access signal group containing many access signals; and when the terminal has a multi-beam simultaneous transmitting capability, the terminal selects multiple access signal groups to be sent.

In an exemplary implementation mode of the present embodiment, the sending resource includes, but is not limited to, a mode of sending, by the terminal, an access signal on a resource corresponding to an access signal group. In this case, in Step S304, the terminal may send the access signal according to a beam switching mode defined by the sending resource.

In an exemplary implementation process, the beam switching mode defined by the sending resource may include the following implementation forms: limiting, for the same access signal group, the terminal to maintain a transmission direction in a process of sending an access signal in the access signal group, or limiting the terminal to switch different transmission directions in a process of sending an access signal in the access signal group.

In Step S302, the resource configuration information may be acquired in one of the following modes:

(1) the terminal receives a broadcast of a to-be-accessed node, and reads the resource allocation information in the broadcast;

(2) the terminal acquires the resource allocation information from a high-layer signaling of a connected node;

(3) the terminal acquires the resource allocation information from a notification message of a connected terminal; and (4) the terminal acquires the resource allocation information from pre-configurations.

Figure 4:
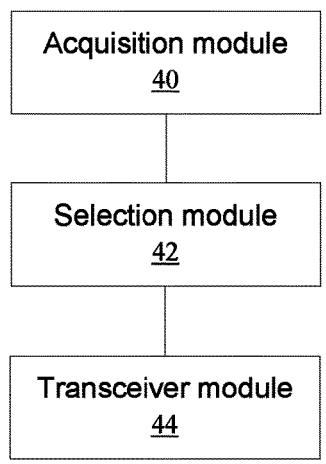
FIG. 4 is a block diagram of a network access device according to an embodiment of the present disclosure.

The embodiment of the present disclosure further provides a network access device for implementing the above-mentioned method. As shown in FIG. 4, the device is used in a terminal and includes an acquisition module 40, a selection module 42 and a transceiver module 44.

The acquisition module 40 is configured to acquire resource allocation information of an access signal group, the resource allocation information including: a sending resource required by the terminal for sending an access signal on a resource corresponding to the access signal group, and an access response resource corresponding to the access signal group, the access signal being used for accessing a network, the access response resource being used for indicating a resource occupied by a receiving device of the access signal when sending a response signal of the access signal.

The selection module 42 is connected to the acquisition module 40, and is configured to select the access signal group according to a preset rule.

The transceiver module 44 is configured to send the access signal on a sending resource corresponding to the access signal group selected by the selection module 42, and receive an access response message sent by an access network on an access response resource corresponding to the selected access signal group.

It is important to note that each of the above-mentioned modules may be implemented by software or hardware. The modules are implemented by the hardware in, but not limited to, the following modes: the acquisition module 40, the selection module 42 and the transceiver module 44 are located in the same processor; or, the acquisition module 40, the selection module 42 and the transceiver module 44 are located in a first processor, a second processor and a third processor respectively.

Figure 5:
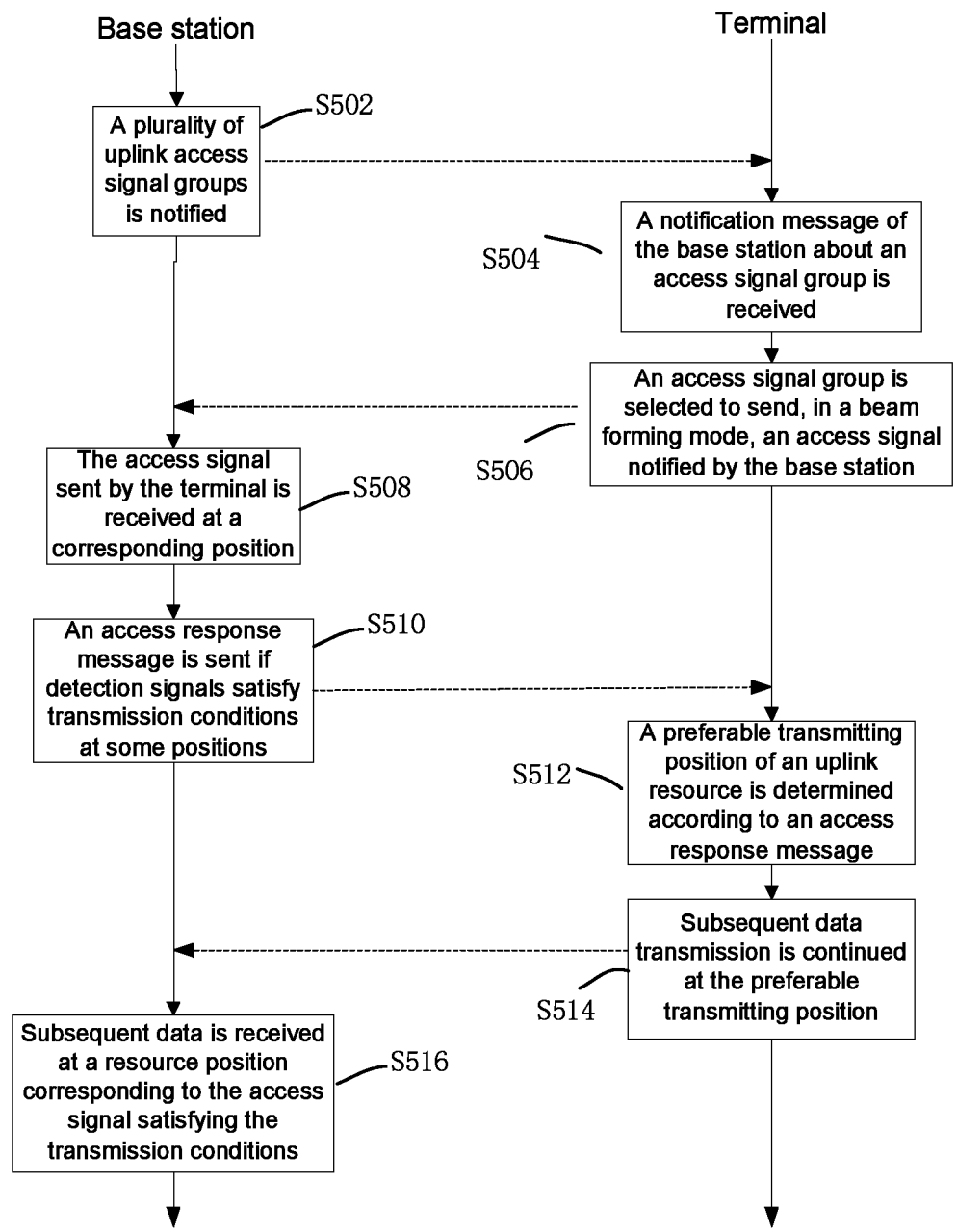
FIG. 5 is a flow diagram of network access according to an exemplary embodiment of the present disclosure.

In an exemplary embodiment, as shown in FIG. 5, the whole flow of the embodiment shown in FIG. 1 to FIG. 4 includes Step S502 to S516.

At step S502, a base station notifies a terminal of a plurality of uplink access signal groups.

At step S504, the terminal receives a notification message of the base station about an access signal group.

At step S506, the terminal selects an access signal group to send, in a beam forming mode, an access signal notified by the base station.

At step S508, the base station receives the access signal sent by the terminal at a corresponding position.

At step S510, the base station sends an access response message if detection signals satisfy transmission conditions at some positions.

At step S512, the terminal determines a preferable transmitting position of an uplink resource according to an access response message (also referred to as a response signal).

At step S514, the terminal continues subsequent data transmission at the preferable transmitting position.

At step S516, the base station receives subsequent data at a resource position corresponding to the access signal satisfying the transmission conditions.

In order to better understand the above-mentioned embodiment, detailed description will be made hereinbelow with preferable embodiments. The main design idea of the following embodiments refers to: configuring an access signal group and a corresponding access response resource, and limiting an access signal sending form of the terminal; configuring a certain sending resource (also referred to as a sending opportunity) and/or a sending sequence and/or a sending frequency domain resource corresponding to the access signal group; configuring access response resources corresponding to different access signal groups; and limiting a form of sending, by the terminal, an access signal on a resource of the access signal group. The detail description will be made hereinbelow.

In practical application, a discovery process may be applied. By means of the discovery process, the base station and the terminal discover each other to perform initial data transmission, thus being prepared for subsequent data transmission and/or further beam adjustment.

The base station broadcasts a plurality of access signal groups and resource configurations of corresponding access responses, or the base station and the terminal appoint a plurality of access signal groups and resource configurations of corresponding access responses.

The base station notifies of a specific correspondence between an access signal group and an access response through a broadcast, and the base station configures that multiple access signals correspond to an access response message in order to save scheduling overheads. In order to ensure that the access time of the terminal is short to the greatest extent or in order to allow the terminal to perform quality sorting on multiple links, the base station configures that an access signal corresponds to an access response message.

The correspondence of an access signal to an access response message is specifically divided into two conditions: an access signal corresponds to a response resource; and multiple access signals correspond to a response resource, the response resource carrying response messages of multiple access signals, and configuration of an access signal to correspond to a response resource may shorten the access time of the terminal to the greatest extent.

The base station also needs to notify or define a form of sending, by the terminal, an access signal. If the base station receives access signals on different receiving beams at different moments and the base station remains a receiving beam direction unchanged at a duration time of an access group, the base station informs the terminal to adjust a transmitting beam within the duration time corresponding to the access group to send an access signal. If the base station receives access signals on different receiving beams at different moments and the base station switches different receiving beams at a duration time of an access group, the base station informs the terminal to remain the same transmitting beam within the duration time corresponding to the access group. If the base station receives access signals on multiple beams, the terminal switches transmitting beams within the duration time corresponding to the access group.

An access signal sending mode of the terminal may be defined in an appointment mode. For example, it is appointed that an access signal is always sent in an uplink access group with the same beam or transmitting beams are switched in an uplink access group.

The terminal acquires these access signal groups and resource information of corresponding access responses as well as access signal transmitting forms. The information acquisition ways of the terminal include: the terminal receives a broadcast message of a to-be-accessed node; the terminal receives a notification message from other connected nodes; and the terminal and the base station appoint an access signal and resource information of a corresponding access response. An appointment mode may map a resource correspondence between an available access signal group and an access response according to an Identifier (ID) of a node.

The terminal measures channel quality to know a current channel state, if the channel quality is poor, the terminal selects a narrow beam to send an access signal so as to make up a path loss, and if the channel quality is good, the terminal selects a wide beam to send an access signal to shorten access time.

Different terminals have different beam capabilities, and if the current channel quality of the terminal is poor and there are many beams of the terminal, the terminal selects multiple narrow beams to send an access signal. Further, if the terminal has multiple beams for parallel sending, multiple access signal groups are selected to send an access signal in order to shorten access time, and the terminal selects a certain number of groups according to the total number of transmitting beams and the number of parallel sending beams. In certain embodiments, the number of the groups selected by the terminal is equal to the number of parallel transmitting beams of the terminal, and the number of access signals in the group is equal to the number of access groups selected by the terminal, divided by the total number of beams.

The terminal sends an access signal in a beam forming mode, and a sequence sending order, a sending opportunity and a sending frequency domain resource of the access signal are determined according to a rule notified or pre-appointed by the base station. Intra-group access signals are sent in a time division manner whilst inter-group access signals are sent in parallel, or on the contrary. The present application document is described as intra-group parallel sending, but the scope of the present disclosure is not defined.

Different access signal groups are distinguished in at least one of the following pre-limiting or notifying modes: distinguishing different access signal groups by means of combination of two or more of three dimensions of a time domain, a frequency domain and a code domain of access signals of access signal groups.

The time domain dimension includes a sending opportunity of an access signal and a duration time of an access signal, the frequency domain dimension includes a frequency domain position and a frequency domain continuous bandwidth of an access signal, and the code domain dimensions are presented as different access sequences.

The terminal sends an access signal according to the selected access signal group, transmission of the access signal following a limiting rule for the corresponding access signal group. Specifically speaking, the upper limit of the number of access signals sent by the terminal in an uplink access process is $\Sigma_{i \in G} g_i$, where G is a set of access signal groups selected by the terminal, and $g_i$ represents the number of access signals included in a group i. The uplink access process herein refers to a process of sending an access signal and receiving an access response in the absence of power increase during selection of the group i through the terminal, and if an access response is not received after the terminal sends all access signals of the group i, the condition of power increase and repeatedly sending of the access signal is not limited by the upper limit of $\Sigma_{i \in G} g_i$.

The terminal needs to follow limiting conditions of the base station about the access signal group i in the uplink access process as follows.

The access signal of the group i is sent at a specified starting time, the starting time being relative to the base station. In the presence of a propagation delay, an access signal receiving time of the base station is delayed, and the following two conditions may be taken into consideration.

The capacity may be improved in a hot-spot region by using high-frequency and high-bandwidth carriers. Under this condition, the radius of a cell is small generally, and the influence of the propagation delay on receiving of an uplink synchronous signal through the base station may be omitted, so the terminal sends an access signal regularly according to receiving data.

If the coverage radius of the base station is larger, the detection performance of the base station will be influenced or a subsequent frame will be disturbed if the transmitting time is not adjusted, and the sending time is adjusted. Specifically, a path loss is estimated according to a downlink signal, a substantial distance between the terminal and the base station is calculated, and the terminal adjusts the advance value of sending an access signal.

The terminal sends the access signals of the group i at a specified frequency domain position, the frequency domain position includes a frequency domain starting position and a bandwidth occupied by the frequency domain, and different frequency domain starting positions and different frequency domain bandwidths may be used for distinguishing different access signal groups.

The terminal sends the access signals in a sequence order specified by the group i, the base station may judge uplink access starting and ending positions of the group i, and in this case, the base station does not need to define a strict uplink access starting time.

The base station receives an access signal at a corresponding position of each access signal group, and the base station judges a group to which the received access signal pertains according to a relationship among a time domain, a frequency domain and a sequence order of the access signal. The base station detects the access signal of this group at a subsequent resource position according to a group index.

After receiving the access signals of the group i, the base station sends an access response message at an access response resource corresponding to the group i, and the base station gives a feedback that there may be one or more resources occupied by the access response message corresponding to the group i. If the access response of the group i configures multiple resources, the base station may abandon one or more access responses according to a scheduling policy or may feed an access response back at an access response resource position corresponding to each group i. If the access responses are not in one-to-one correspondence to the access signals, access has a strict correspondence, and the terminal is required to receive all resource positions of the access responses corresponding to the group i before identifying that uplink transmission is satisfied.

If an access signal group corresponds to more access response messages, the base station sends an access response message, carrying a quality indicating field, of the group i.

After receiving one or more access response messages, the terminal judges whether to send subsequent access signals, if the terminal can determine a transmitting beam satisfying the uplink transmission according to the received access response message, transmission of the subsequent access signals is stopped to reduce access delays and overheads, and otherwise, subsequent access signals of the group i are continuously sent. If the transmitting beam satisfying the uplink transmission is not determined yet after the access signals of the group i are completely sent, an access signal group may be re-selected, or the group i is still used to send the access signals after power increase.

In a practical system application, the concept of a beam refers to that the beam can reduce leakage of signal power of the base station in an unavailable direction, thus ensuring the direction characteristic of the signal power and enhancing the coverage range of the base station.

The access signal groups are used for distinguishing different terminals in an access process, and the terminal selects the access signal group i to send access signals. The terminal sends the access signals in an uplink beam forming manner, and the base station implicitly notifies an uplink transmitting beam used by an uplink access through an access response. The terminal judges that an uplink beam satisfying uplink transmission is used for sending uplink data subsequently. The uplink access feedback of the base station may be relevant information of the index, such as a time domain resource set index, a frequency domain set index, a signal sequence index or values equivalent to these indexes. All expressible indexes relevant or equivalent to the downlink beam indexes in the embodiments of the present disclosure fall within the scope of protection of the present disclosure.

Embodiment One

A base station notifies configuration information of a network access signal group, the base station notifies resource configuration information of a corresponding access response, and the base station notifies a terminal of an uplink transmitting form.

The base station configures an access response resource for each access signal of an access signal group, the base station receives beams, non-switched, within an access group period, and the base station notifies the terminal to switch the beams to send different access signals of a group.

Example One

The base station notifies 18 uplink access signal groups through a broadcast channel, and the access signal groups are distinguished through at least one dimension of a time domain, a frequency domain and a code domain.

Figure 16:
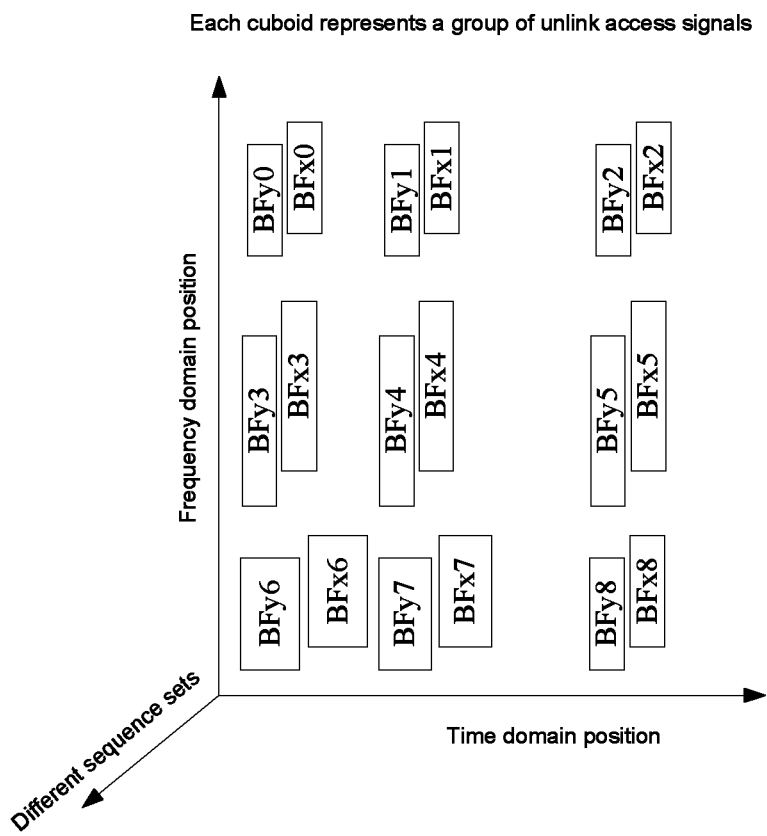
FIG. 16 is a division diagram of an access signal group according to an embodiment of the present disclosure.

As shown in FIG. 16, access continuing periods of these access signal groups namely BFx0, BFy0, BFx1, BFy1, BFx2, BFy2, BFx3, BFy3, BFx4, BFy4, BFx8 and BFy8 are 20 elementary time allocation units, each access continuing period including four access sub-frames. Access continuing periods of these groups namely BFx6, BFy6, BFx7 and BFy7 are 40 elementary time allocation units, each access continuing period including eight access sub-frames. Frequency domain bandwidths of these groups namely BFx0, BFy0, BFx1, BFy1, BFx2, BFy2, BFx3, BFy3, BFx4, BFy4, BFx8 and BFy8 are one elementary frequency domain unit, and frequency domain bandwidths of the other groups are two elementary frequency domain units. Multiple access signals of the same group are distinguished through a time order, and it is not defined whether different access signals in a group are identical access sequences.

Figure 6:
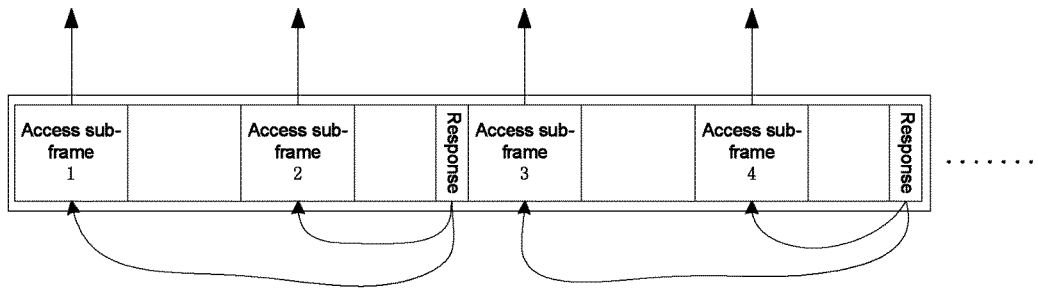
FIG. 6 is an allocation diagram of an uplink access sub-frame and a corresponding access response resource according to an embodiment of the present disclosure.

The base station notifies resource configuration information of a corresponding access response through a broadcast channel. As shown in FIG. 6, four access sub-frames are configured for an access signal group. The base station notifies, through the broadcast channel, the terminal of response messages of two access signals in the access signal group carried in each access response resource.

The base station notifies, through the broadcast channel, the terminal to switch beams within an access signal group continuing period to send different access signals.

The terminal receives a broadcast of the base station to identify an uplink access signal group and a resource position of a corresponding access response as well as a form of sending an access signal.

The terminal measures a channel, determines that the channel condition is good according to a measurement result, and selects four wider beams to send access signals.

The terminal does not have a multi-beam parallel sending capability. Therefore, the terminal selects the group BFx0 to send an access signal, and each access sub-frame sends the access signal with different transmitting beams.

Figure 15:
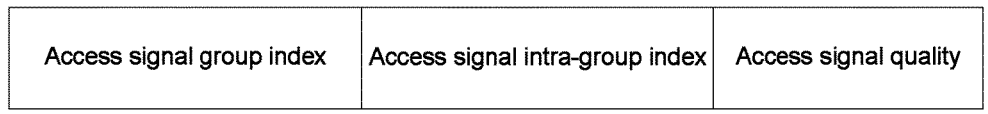
FIG. 15 is another format diagram of an access response message according to an embodiment of the present disclosure.

The base station receives the access signal at a resource position corresponding to the access signal group, and sends an access response message at a corresponding response resource position. The same access response resource carries access response messages of two sub-frames, contents carried in access responses are as shown in FIG. 15, identification for the access signal is included, and an access signal group index, an access signal intra-group index and an access signal quality indicator are included therein. The terminal is notified of a transmitting beam corresponding to a response message through the group index and the intra-group index, and a quality indicating message is used for notifying the terminal of the quality of an access signal corresponding to the transmitting beam.

Figure 19:
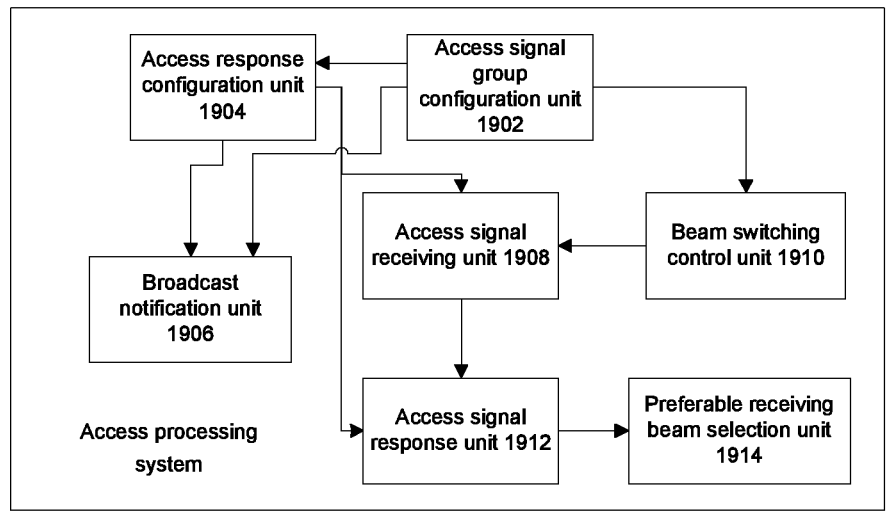
FIG. 19 is another composition block diagram of a terminal access system according to an embodiment of the present disclosure.

FIG. 19 shows a block diagram of an access processing system of a base station. An access signal group configuration unit 1902 selects an access signal group for the present base station or a certain cell in the base station, and the access signal group configuration unit 1902 configures whether the terminal performs beam switching in an access signal group period. An access response configuration unit 1904 determines an access response resource configuration corresponding to an access signal group of the present base station or a cell in the present base station according to an access signal group configuration condition of the present base station or the cell in the present base station. A broadcast notification unit 1906 completes notification of configuration information of an access signal group and a corresponding access response. An access signal receiving unit 1908 receives an access signal at a corresponding position according to an access response configuration condition. A beam switching control unit 1910 determines whether to switch receiving beams within an access signal group continuing period according to the access signal group configuration unit 1902. An access signal response unit 1912 sends an access response message at a corresponding resource position. A preferable receiving beam selection unit 1914 selects a preferable receiving beam through different access signal continuing periods.

The terminal reads a broadcast message of the base station through a broadcast/signaling reading module to determine the configuration information of an access signal group and a corresponding access response resource, and the terminal reads a sending mode of an access signal within a continuing period through the broadcast/signaling reading module; a channel quality detection module determines the channel quality through a measurement channel; a transmitting beam identification module determines the number of transmitting beams corresponding to different beam widths; an access signal group selection module selects an access signal group according to a comprehensive judgment on the access signal group configuration, the channel quality and the own beam capability of the terminal; a terminal beam adjustment module determines to adjust or fix a beam within an access signal group continuing period according to a read broadcast or signaling; an access signal transmitting module switches different beams to send an access signal within an access signal group continuing period according to the transmitting beam adjustment module; an access response message receiving module receives an access response message at a corresponding position according to read access response configuration information; a link quality sorting module determines the signal quality of different transmitting beams according to a quality indicator carried in an access response; and a preferable link identification module selects a preferable link therefrom according to a link quality sorting result.

Figure 17:
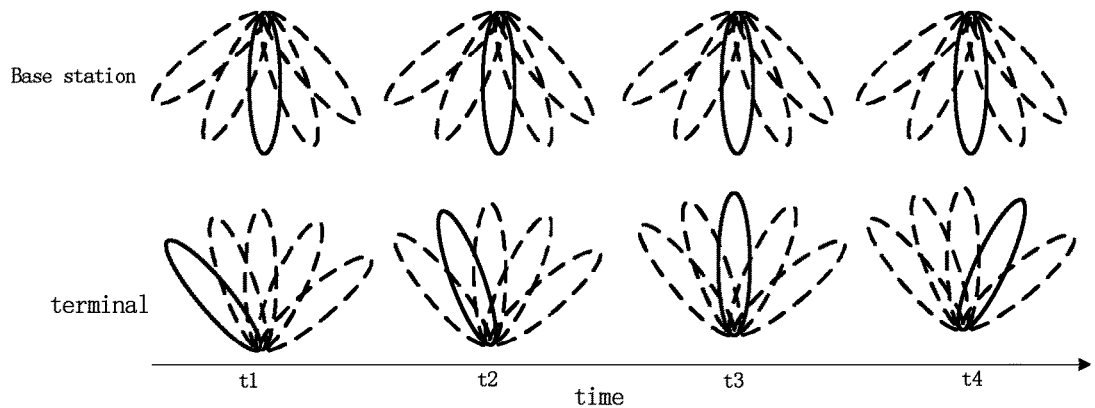
FIG. 17 is a transmitting and receiving beam diagram of an access signal group period according to an embodiment of the present disclosure.

The base station and the terminal attempt combining a receiving beam and all transmitting beams within an access group continuing period, as shown in FIG. 17. The base station switches receiving beams within a next access period, receives an access signal sent by the terminal, and gives a response, and the terminal repeats the above-mentioned process. By means of multiple access signal periods, the terminal and the base station may select a preferable receiving beam and transmitting beam to be prepared for further beam correction or initial data transmission.

Example Two

The base station notifies 20 uplink access signal groups through a broadcast channel, and the access signal groups are distinguished through at least one dimension of a time domain, a frequency domain and a code domain.

Figure 18:
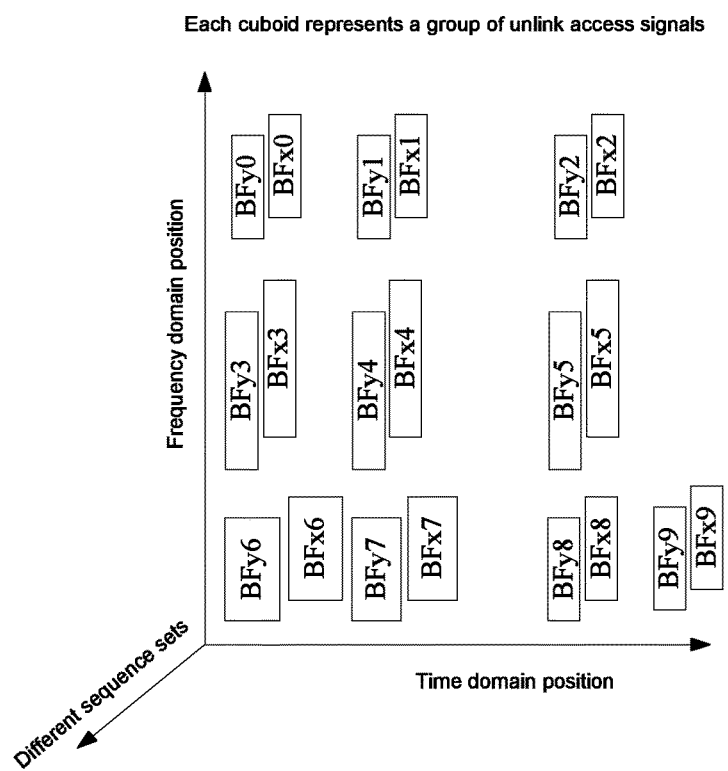
FIG. 18 is another division diagram of an access signal group according to an embodiment of the present disclosure.

As shown in FIG. 18, access continuing periods of these access signal groups namely BFx0, BFy0, BFx1, BFy1, BFx2, BFy2, BFx3, BFy3, BFx4, BFy4, BFx8, BFy8, BFx9 and BFy9 are 20 elementary time allocation units, each access continuing period including four access sub-frames. Access continuing periods of these groups namely BFx6, BFy6, BFx7 and BFy7 are 40 elementary time allocation units, each access continuing period including eight access sub-frames. Frequency domain bandwidths of these groups namely BFx0, BFy0, BFx1, BFy1, BFx2, BFy2, BFx3, BFy3, BFx4, BFy4, BFx8, BFy8, BFx9 and BFy9 are one elementary frequency domain unit, and frequency domain bandwidths of the other groups are two elementary frequency domain units. Multiple access signals of the same group are distinguished through a time order, and it is not defined whether different access signals in a group are identical access sequences.

Figure 7:
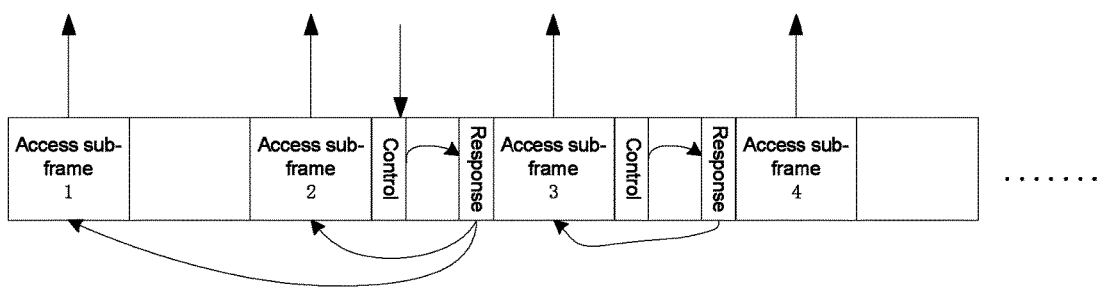
FIG. 7 is another allocation diagram of an uplink access sub-frame and a corresponding access response resource according to an embodiment of the present disclosure.

The base station notifies resource configuration information of a corresponding access response through a broadcast channel, as shown in FIG. 7. An access response resource position corresponding to an access signal group is not appointed or notified, so the terminal needs to continuously or frequently monitor a control channel and to acquire an access response position through the control channel after sending an access signal.

The base station notifies, through the broadcast channel, the terminal to switch beams within an access signal group continuing period to send different access signals.

The terminal receives a broadcast of the base station to obtain an uplink access signal group resource position and a form of sending an access signal.

The terminal measures a channel, determines that the channel condition is good according to a measurement result, and selects four wider beams to send access signals.

The terminal does not have a multi-beam parallel sending capability. The terminal selects the group BFx0 to send an access signal, and each access sub-frame sends the access signal with different transmitting beams.

The base station receives the access signal at a resource position corresponding to the access signal group, determines two access signals in the access signal group BFx0 according to own processing resources and scheduling resources, and then sends a response. The same access response resource carries access response messages of two sub-frames, contents carried in access responses are as shown in FIG. 15, identification for the access signal is included, and an access signal group index, an access signal intra-group index and an access signal quality indicator are included therein, and are used for identifying the quality of different access signals.

The terminal judges whether a transmitting beam corresponding to an access signal sent previously satisfies data transmission according to the received access response, if so, subsequent sending of an access signal is stopped, and access time and overheads are saved.

The terminal reads a broadcast message of the base station through a broadcast/signaling reading module to determine configuration information of an access signal group and a corresponding access response resource, and the terminal reads a sending mode of an access signal within a continuing period through the broadcast/signaling reading module; a channel quality detection module determines the channel quality through a measurement channel; a transmitting beam identification module determines the number of transmitting beams corresponding to different beam widths; an access signal group selection module selects an access signal group according to a comprehensive judgment on the access signal group configuration, the channel quality and the own beam capability of the terminal; a terminal beam adjustment module determines to adjust or fix a beam within an access signal group continuing period according to a read broadcast or signaling; an access signal transmitting module switches different beams to send an access signal within an access signal group continuing period according to the transmitting beam adjustment module, and the access signal transmitting module judges whether to abandon transmission of a subsequent access signal according to a link quality identification module; an access response message receiving module receives an access response message at a corresponding position according to read access response configuration information; a link quality sorting module determines the signal quality of different transmitting beams according to a quality indicator carried in an access response, and the link quality identification module will feed identification information back to the access signal transmitting module; and a preferable link identification module selects a preferable link therefrom according to a link quality sorting result.

The base station switches receiving beams within a next access period, receives an access signal sent by the terminal, and gives a response.

By means of multiple access signal periods, the terminal and the base station may select a preferable receiving beam and transmitting beam to be prepared for further beam correction or initial data transmission.

Embodiment Two

A base station and a terminal appoint configuration information of a network access signal group, the base station notifies resource configuration information of a corresponding access response, and the base station and the terminal pre-appoint an uplink transmission form.

The base station and the terminal pre-define some access signal groups, and the terminal determines an available access signal group according to an ID of the base station. Access response resource configuration information of the access signal group is notified by the base station. A form of sending, by the terminal, an access signal is appointed as always remaining the same transmitting beam in an access signal group.

Example One

The base station configures an access response resource for each access signal in an access signal group.

Figure 20:
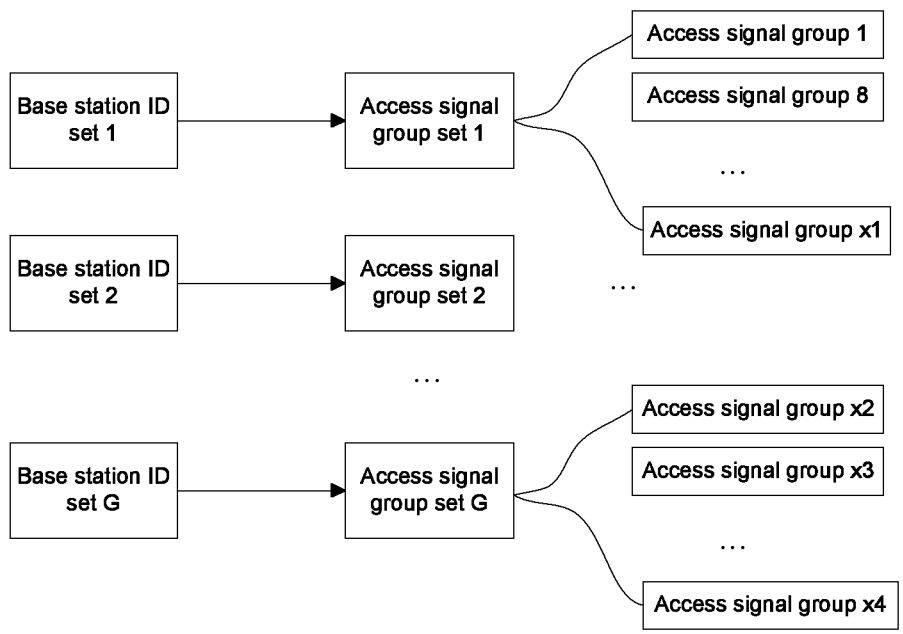
FIG. 20 is a diagram of a correspondence between a base station ID combination and an access signal group combination as well as an access signal group according to an embodiment of the present disclosure.

The base station and the terminal pre-define all access signal groups and resource configurations thereof, and the base station determines a serial number of the present available access group according to an expression ID mod N, where ID is a base station identification index. If ID=120, N=7 and ID mod 7=1, then all groups which meet idxG mod 7=1 can be used for this cell, idxG being a serial number of an access signal group. The base station is divided into a plurality of sets by ID, different sets correspond to different access signal group sets, different access signal group sets include one or more access signal groups, and different access signal groups are distinguished in at least one dimension of a time domain, a frequency domain and a code domain. One base station may have one or more base station identification indexes, which cannot be repeated within a region. FIG. 20 shows a correspondence between access signal groups.

The base station notifies, through a broadcast channel, the terminal of configuration of an access response resource of the access signal group as a response resource position corresponding to each access signal.

Figure 22:
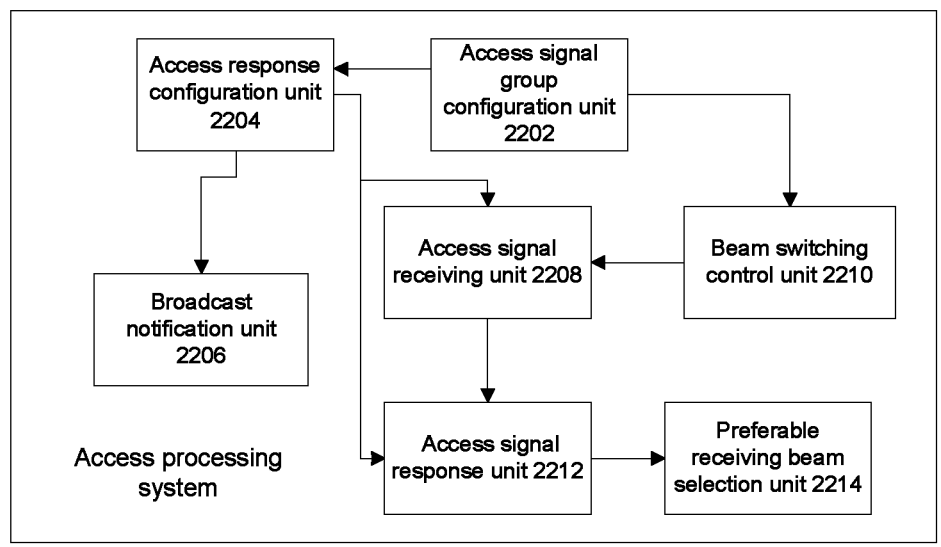
FIG. 22 is a further composition block diagram of a terminal access system according to an embodiment of the present disclosure.

FIG. 22 shows a block diagram of an access processing system of a base station. An access signal group configuration unit 2202 selects an access signal group for the present base station or a certain cell in the base station, and the access signal group configuration unit 2202 configures whether the terminal performs beam switching in an access signal group period. An access response configuration unit 2204 determines an access response resource configuration corresponding to an access signal group of the present base station or a cell in the present base station according to an access signal group configuration condition of the present base station or the cell in the present base station. A broadcast notification unit 2206 completes notification of configuration information of an access signal group and a corresponding access response. An access signal receiving unit 2208 receives an access signal at a corresponding position according to an access response configuration condition. A beam switching control unit 2210 determines whether to switch receiving beams within an access signal group continuing period according to the access signal group configuration unit 2202. An access signal response unit 2212 sends an access response message at a corresponding resource position. A preferable receiving beam selection unit 2214 selects a preferable receiving beam through different access signal continuing periods.

A form of sending an access signal within an uplink access period is appointed as remaining a transmitting beam unchanged.

The terminal receives a downlink signal of the base station to judge a base station identification index ID, and the terminal confirms all available access signal groups according to the base station identification index ID.

Figure 9:
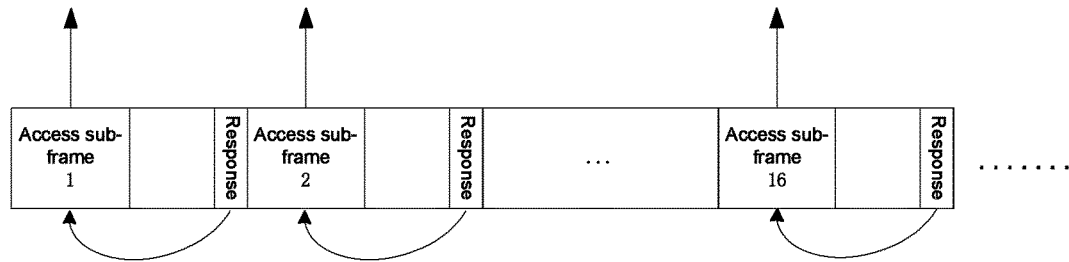
FIG. 9 is a yet further allocation diagram of an uplink access sub-frame and a corresponding access response resource according to an embodiment of the present disclosure.

The terminal measures a downlink signal to determine that the channel quality is poor, and the terminal does not have a multi-beam parallel sending capability; the terminal selects an access signal group 1, the group 1 including 16 access signals; the terminal sends an access signal on an access sub-frame with a narrow beam; and a transmitting beam of the terminal within an access duration time of the group 1 remains unchanged. The terminal receives a broadcast of the base station to obtain a corresponding configuration relationship, as shown in FIG. 9, between the access sub-frame of the group 1 and a response signal, each access sub-frame corresponding to an access signal response resource.

The base station receives the access signal at a resource position corresponding to the access signal group, and then sends an access response message on the previously notified access response resource. Contents carried in an access response are as shown in FIG. 15, identification for the access signal is included, and an access signal group index, an access signal intra-group index and an access signal quality indicator are included therein, and are used for identifying the quality of different access signals.

The terminal judges whether a transmitting beam corresponding to an access signal sent previously satisfies data transmission according to the received access response, if so, subsequent sending of an access signal is stopped, and access time and overheads are saved.

Figure 11:
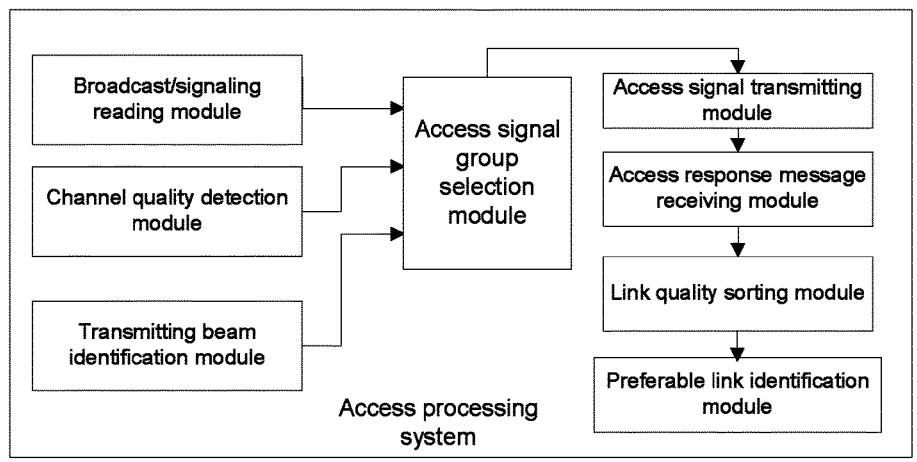
FIG. 11 is another composition block diagram of a terminal access system according to an embodiment of the present disclosure.

FIG. 11 shows a block diagram of an access processing system of a terminal. The terminal reads a broadcast message of the base station through a broadcast/signaling reading module to determine the configuration information of an access signal group and a corresponding access response resource, and the terminal reads a sending mode of an access signal within a continuing period through the broadcast/signaling reading module; a channel quality detection module determines the channel quality through a measurement channel; an access signal group selection module selects an access signal group according to a comprehensive judgment on the access signal group configuration, the channel quality and the own beam capability of the terminal; an access signal transmitting module sends an access signal according to a resource corresponding to the access signal group selected by the access signal group selection module; an access response message receiving module receives an access response message at a corresponding position according to read access response configuration information; a link quality sorting module determines the signal quality of different transmitting beams according to a quality indicator carried in an access response; and a preferable link identification module selects a preferable link therefrom according to a link quality sorting result.

Figure 21:
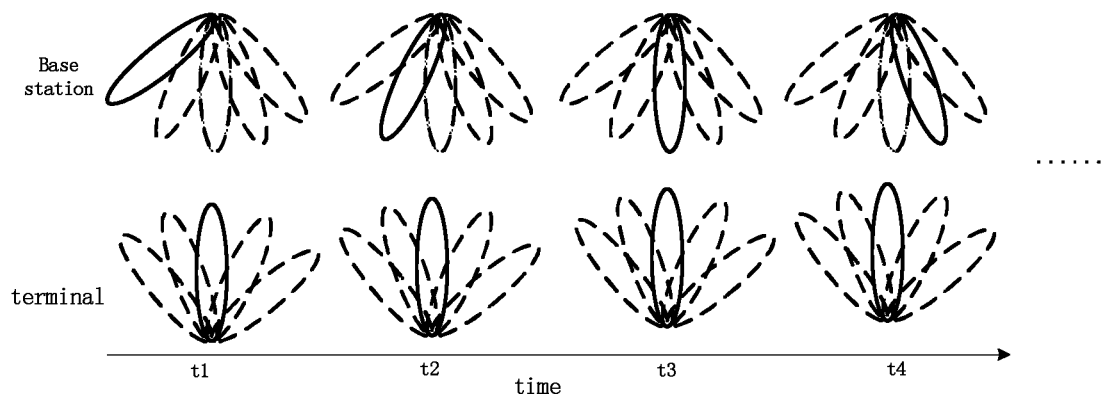
FIG. 21 is another transmitting and receiving beam diagram of an access signal group period according to an embodiment of the present disclosure.

The base station switches receiving beams within a continuing period of the group 1, and the terminal and the base station attempt combining multiple receiving beams and a transmitting beam within an access group continuing period, as shown in FIG. 21. By means of multiple access signal group periods, the terminal and the base station may select a preferable transmitting beam and a preferable receiving beam.

Example Two

Multiple access signals of an access signal group configure an access response resource.

An access response resource position includes multiple access response messages of a group, each access signal having a corresponding access response message.

The base station and the terminal pre-define all access signal groups and resource configurations thereof, and the base station determines a serial number of the present available access group according to an expression ID mod N, where ID is a base station identification index. If ID=120, N=7 and ID mod 7=1, all groups which meet idxG mod 7=1 can be used for this cell, idxG being a serial number of an access signal group. The base station is divided into a plurality of sets by ID, different sets correspond to different access signal group sets, different access signal group sets include one or more access signal groups, and different access signal groups are distinguished in at least one dimension of a time domain, a frequency domain and a code domain. One base station may have one or more base station identification indexes, which cannot be repeated within a region. FIG. 20 shows a correspondence between access signal groups.

The base station and the terminal pre-define an access response resource corresponding to the access signal group to be configured as a response resource position corresponding to each access signal. An access response resource position carries response information of an access signal, as shown in FIG. 9.

Figure 23:
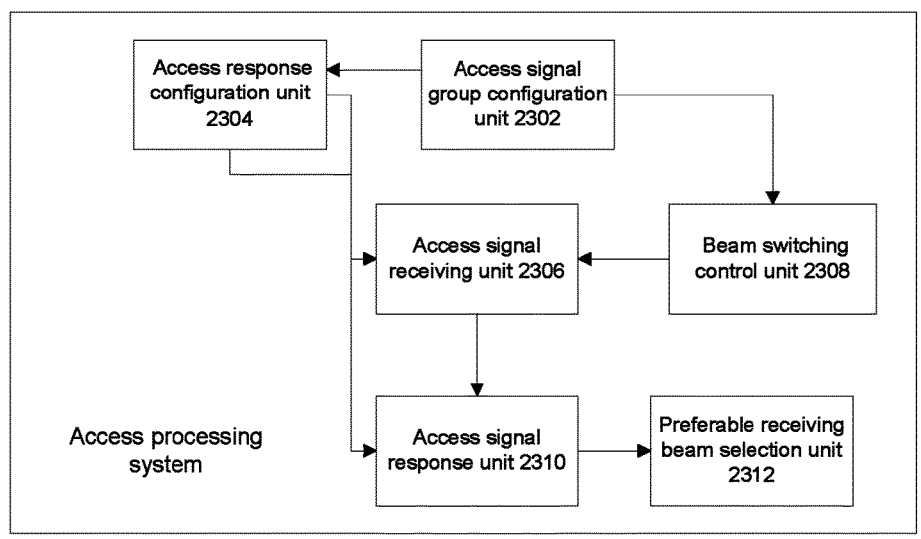
FIG. 23 is a yet further composition block diagram of a terminal access system according to an embodiment of the present disclosure.

FIG. 23 shows a block diagram of an access processing system of a base station. An access signal group configuration unit 2302 selects an access signal group for the present base station or a certain cell in the base station, and the access signal group configuration unit 2302 configures whether the terminal performs beam switching in an access signal group period. An access response configuration unit 2304 determines an access response resource configuration corresponding to an access signal group of the present base station or a cell in the present base station according to an access signal group configuration condition of the present base station or the cell in the present base station. An access signal receiving unit 2306 receives an access signal at a corresponding position according to an access response configuration condition. A beam switching control unit 2308 determines whether to switch receiving beams within an access signal group continuing period according to the access signal group configuration unit 2302. An access signal response unit 2310 sends an access response message at a corresponding resource position. A preferable receiving beam selection unit 2312 selects a preferable receiving beam through different access signal continuing periods.

An access signal group period is appointed as remaining a transmitting beam unchanged.

The terminal receives a downlink signal of the base station to judge an identification index ID of the base station, and the terminal determines available access signal groups according to the ID.

The terminal measures a downlink signal to determine that the channel quality is poor, and the terminal does not have a multi-beam parallel sending capability; the terminal selects an access signal group 1, the group 1 including 16 access signals; the terminal sends an access signal on an access sub-frame with a narrow beam; and a transmitting beam of the terminal within an access duration time of the group 1 remains unchanged.

The terminal receives the access signal, and then sends an access response message on the previously notified access response resource. Contents carried in an access response are as shown in FIG. 15, identification for the access signal is included, and an access signal group index, an access signal intra-group index and an access signal quality indicator are included therein, and are used for identifying the quality of different access signals.

The terminal judges whether a transmitting beam corresponding to an access signal sent previously satisfies data transmission according to the received access response, if so, subsequent sending of an access signal is stopped, and access time and overheads are saved.

FIG. 11 shows a block diagram of an access processing system of a terminal. The terminal reads a broadcast message of the base station through a broadcast/signaling reading module to determine the configuration information of an access signal group and a corresponding access response resource, and the terminal reads a sending mode of an access signal within a continuing period through the broadcast/signaling reading module; a channel quality detection module determines the channel quality through a measurement channel; an access signal group selection module selects an access signal group according to a comprehensive judgment on the access signal group configuration, the channel quality and the own beam capability of the terminal; an access signal transmitting module sends an access signal according to a resource corresponding to the access signal group selected by the access signal group selection module; an access response message receiving module receives an access response message at a corresponding position according to read access response configuration information; a link quality sorting module determines the signal quality of different transmitting beams according to a quality indicator carried in an access response; and a preferable link identification module selects a preferable link therefrom according to a link quality sorting result.

The base station switches receiving beams within a continuing period of the group 1, and the terminal and the base station attempt combining multiple receiving beams and a transmitting beam within an access group continuing period, as shown in FIG. 21. By means of multiple access signal group periods, the terminal and the base station select a preferable transmitting beam and a preferable receiving beam.

Embodiment Three

A base station notifies configuration information of a network access signal group, the base station notifies resource configuration information of a corresponding access response, and the base station notifies a terminal of an uplink transmitting form.

The base station configures an access response resource for multiple access signals of an access signal group, the base station receives beams, non-switched, within an access group period, and the base station notifies the terminal to switch the beams to send different access signals of a group.

Example One

The terminal receives a broadcast channel of a to-be-accessed base station to acquire an access signal group and a corresponding response resource configuration message as well as a transmitting mode of an access signal.

A group of access signals corresponds to only one access response resource, and the response resource carries only one access response; a response message does not carry a quality indicating message; and a UE does not have a multi-beam parallel sending capability.

Transmitting beams corresponding to the access signals are not sorted.

The base station notifies 18 uplink access signal groups through a broadcast channel, the access signal groups being distinguished through at least one dimension of a time domain, a frequency domain and a code domain.

As shown in FIG. 16, access continuing periods of these access signal groups namely BFx0, BFy0, BFx1, BFy1, BFx2, BFy2, BFx3, BFy3, BFx4, BFy4, BFx8 and BFy8 are 20 elementary time allocation units, each access continuing period including four access sub-frames. Access continuing periods of these groups namely BFx6, BFy6, BFx7 and BFy7 are 40 elementary time allocation units, each access continuing period including eight access sub-frames. Frequency domain bandwidths of these groups namely BFx0, BFy0, BFx1, BFy1, BFx2, BFy2, BFx3, BFy3, BFx4, BFy4, BFx8 and BFy8 are one elementary frequency domain unit, and frequency domain bandwidths of the other groups are two elementary frequency domain units. Multiple access signals of the same group are distinguished through a time order, and it is not defined whether different access signals in a group are identical access sequences.

Figure 8:
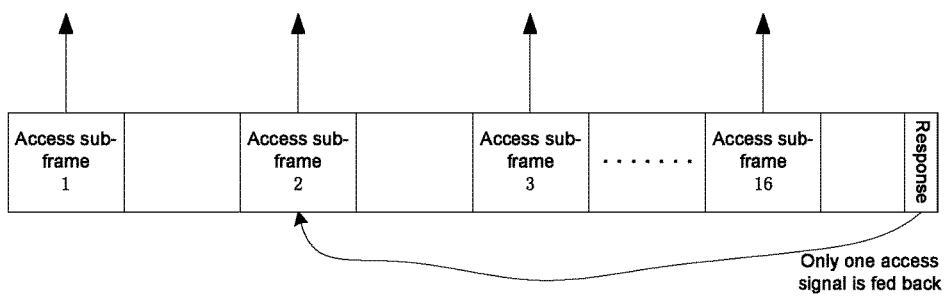
FIG. 8 is a further allocation diagram of an uplink access sub-frame and a corresponding access response resource according to an embodiment of the present disclosure.

The base station notifies resource configuration information of a corresponding access response through a broadcast channel, as shown in FIG. 8. Each access group corresponds to only one access response resource, and the access response resource carries a response message of only one access signal.

The base station notifies, through the broadcast channel, the terminal to switch beams within an access signal group continuing period to send access signals.

The base station notifies, through the broadcast channel, the terminal of a position where a unique access signal response message of this access signal group carried in each access response resource.

The terminal receives a broadcast of the base station to identify an uplink access signal group and a resource position of a corresponding access response as well as a form of sending an access signal.

The terminal measures a channel, determines that the channel condition is poor according to a measurement result, and selects 16 narrow beams to send access signals.

The terminal does not have a multi-beam parallel sending capability. Therefore, the terminal selects the group BFx0 to send an access signal, and each access sub-frame sends the access signal with different transmitting beams.

Figure 14:
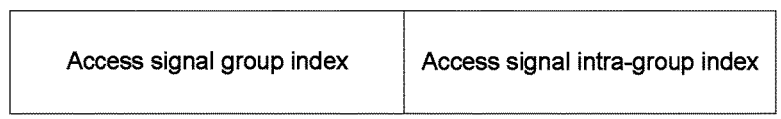
FIG. 14 is a format diagram of an access response message according to an embodiment of the present disclosure.

The base station receives the access signal at a resource position corresponding to the access signal group, and then sends an access response message at a corresponding response resource position. The same access response resource carries only one access response message. Contents carried in an access response are as shown in FIG. 14, identification for the access signal is included, and an access signal group index and an access signal intra-group index are included therein.

FIG. 19 shows a block diagram of an access processing system of a base station. An access signal group configuration unit selects an access signal group for the present base station or a certain cell in the base station, and the access signal group configuration unit configures whether the terminal performs beam switching in an access signal group period. An access response configuration unit determines an access response resource configuration corresponding to an access signal group of the present base station or a cell in the present base station according to an access signal group configuration condition of the present base station or the cell in the present base station. A broadcast notification unit completes notification of configuration information of an access signal group and a corresponding access response. An access signal receiving unit receives an access signal at a corresponding position according to an access response configuration condition. A beam switching control unit determines whether to switch receiving beams within an access signal group continuing period according to the access signal group configuration unit. An access signal response unit sends an access response message at a corresponding resource position.

The terminal and the base station attempt combining a receiving beam and all transmitting beams within an access group continuing period, as shown in FIG. 17.

The terminal judges a preferable transmitting beam of this access group according to the received access response.

Figure 10:
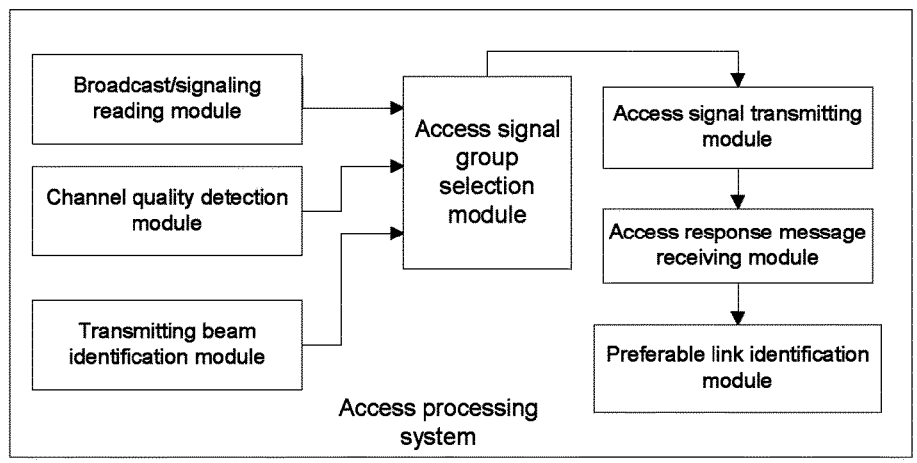
FIG. 10 is a composition block diagram of a terminal access system according to an embodiment of the present disclosure.

FIG. 10 shows an access processing system of a terminal. The terminal reads a broadcast message of the base station through a broadcast/signaling reading module to determine the configuration information of an access signal group and a corresponding access response resource, and the terminal reads a sending mode of an access signal within a continuing period through the broadcast/signaling reading module; a channel quality detection module determines the channel quality through a measurement channel; a transmitting beam identification module confirms the number of beams corresponding to different beam widths; an access signal group selection module selects an access signal group according to a comprehensive judgment on the access signal group configuration, the channel quality and the own beam capability of the terminal; an access signal transmitting module sends an access signal according to a resource corresponding to the access signal group selected by the access signal group selection module; an access response message receiving module receives an access response message at a corresponding position according to read access response configuration information; and a preferable link identification module selects a preferable link according to the received access response.

The base station switches receiving beams within a next access period, receives an access signal sent by the terminal, and gives a response.

By means of multiple access signal periods, the terminal and the base station may select a preferable receiving beam and transmitting beam to be prepared for further beam correction or initial data transmission.

Example Two

The terminal receives a notification message from another connected base station and acquires an access signal group and a corresponding response resource configuration message as well as transmitting mode of an access signal.

A group of access signals corresponds to only one access response resource, and the response resource carries only one access response; a response message carries a quality indicating message; and a UE has a multi-beam parallel sending capability, but cannot achieve omni-directional multi-beam coverage.

The terminal has been connected to a base station 1, and the base station 1 notifies, through a high-layer signaling, the terminal of an access signal group for accessing a base station 2 and configuration information of an access response resource. The base station 1 notifies the terminal of 18 uplink access signal groups, and these groups can be used for accessing the base station 2. The access signal groups are distinguished through at least one dimension of a time domain, a frequency domain and a code domain.

As shown in FIG. 16, access continuing periods of these access signal groups namely BFx0, BFy0, BFx1, BFy1, BFx2, BFy2, BFx3, BFy3, BFx4, BFy4, BFx8 and BFy8 are 20 elementary time allocation units, each access continuing period including four access sub-frames. Access continuing periods of these groups namely BFx6, BFy6, BFx7 and BFy7 are 40 elementary time allocation units, each access continuing period including eight access sub-frames. Frequency domain bandwidths of these groups namely BFx0, BFy0, BFx1, BFy1, BFx2, BFy2, BFx3, BFy3, BFx4, BFy4, BFx8 and BFy8 are one elementary frequency domain unit, and frequency domain bandwidths of the other groups are two elementary frequency domain units. Multiple access signals of the same group are distinguished through a time order, and it is not defined whether different access signals in a group are identical access sequences.

The base station 1 notifies, through the high-layer signaling, access response resource configurations corresponding to these access signal groups, as shown in FIG. 8. Each access group corresponds to only one access response resource, and the access response resource carries a response message of only one access signal.

Figure 12:
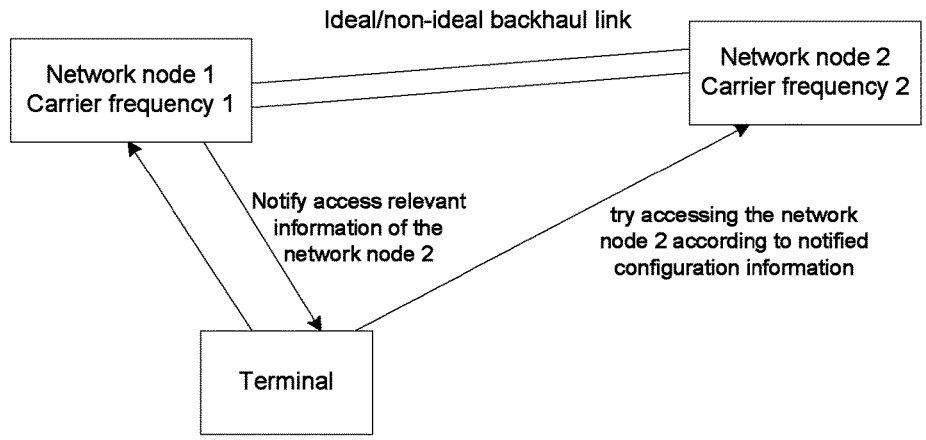
FIG. 12 is a diagram of auxiliary access of a terminal to another node through a connected node according to an embodiment of the present disclosure.

FIG. 12 shows a relationship among a network node (base station) 1, a network node (base station) 2 and the terminal, and the base station 1 notifies, through the high-layer signaling, the terminal to switch beams within an access signal group continuing period to send access signals.

The base station notifies, through the high-layer signaling, the terminal of a position where a unique access signal response message of this access signal group carried in each access response resource.

The terminal receives a notification message of the base station to identify an access signal group for accessing the base station 2 and a resource position of a corresponding access response as well as a form of sending an access signal.

The terminal measures a channel of the base station 2, determines that the channel condition is poor according to a measurement result, and selects 16 narrow beams to send access signals.

The terminal does not have a multi-beam parallel sending capability, the terminal selects the group BFx0 to send an access signal, and each access sub-frame sends the access signal with different transmitting beams.

The base station 2 receives the access signal at a resource position corresponding to the access signal group, and then sends an access response message at a corresponding response resource position. The same access response resource carries only one access response message. Contents carried in an access response are as shown in FIG. 14, identification for the access signal is included, and an access signal group index and an access signal intra-group index are included therein.

FIG. 23 shows a block diagram of an access processing system of a base station 2. An access signal group configuration unit selects an access signal group for the present base station or a certain cell in the base station, and the access signal group configuration unit configures whether the terminal performs beam switching in an access signal group period. An access response configuration unit determines an access response resource configuration corresponding to an access signal group of the present base station or a cell in the present base station according to an access signal group configuration condition of the present base station or the cell in the present base station. An access signal receiving unit receives an access signal at a corresponding position according to an access response configuration condition. A beam switching control unit determines whether to switch receiving beams within an access signal group continuing period according to the access signal group configuration unit. An access signal response unit sends an access response message at a corresponding resource position.

The terminal and the base station attempt combining a receiving beam and all transmitting beams within an access group continuing period, as shown in FIG. 17.

The terminal judges a preferable transmitting beam of this access group according to the received access response.

FIG. 10 shows an access processing system of a terminal. The terminal reads a broadcast message of the base station through a broadcast/signaling reading module to determine the configuration information of an access signal group and a corresponding access response resource, and the terminal reads a sending mode of an access signal within a continuing period through the broadcast/signaling reading module; a channel quality detection module determines the channel quality through a measurement channel; a transmitting beam identification module confirms the number of beams corresponding to different beam widths; an access signal group selection module selects an access signal group according to a comprehensive judgment on the access signal group configuration, the channel quality and the own beam capability of the terminal; an access signal transmitting module sends an access signal according to a resource corresponding to the access signal group selected by the access signal group selection module; an access response message receiving module receives an access response message at a corresponding position according to read access response configuration information; and a preferable link identification module selects a preferable link according to the received access response.

The base station switches receiving beams within a next access period, receives an access signal sent by the terminal, and gives a response.

By means of multiple access signal periods, the terminal and the base station may select a preferable receiving beam and transmitting beam to be prepared for further beam correction or initial data transmission.

Example Three

The terminal receives a notification message from another terminal that has been networked, and acquires an access signal group and a corresponding response resource configuration message as well as transmitting mode of an access signal.

Figure 13:
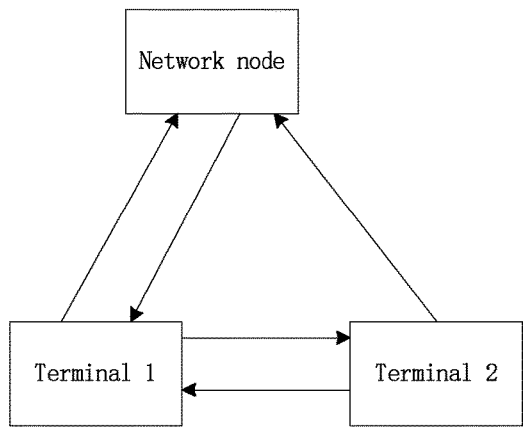
FIG. 13 is another diagram of auxiliary access of a terminal to another node through a connected node according to an embodiment of the present disclosure.

As shown in FIG. 13, the terminal 1 is connected to the base station, the terminal 2 is connected to the terminal 1, and the terminal 2 is not connected to a network node (base station). The process of connecting the terminal 1 to the base station refers to the above-mentioned embodiment.

The terminal 1 informs, through the notification message, the terminal 2 of an access signal group for accessing the base station and resource configuration information of a corresponding access response.

Through the notification message of the terminal 1, the terminal 2 learns of that transmitting beams should be switched within an access signal group continuing period.

Through the notification message of the terminal 1, the terminal 2 learns of that an access signal group corresponds to an access response resource and an access response resource only includes a unique access response message of this group.

The terminal determines, by measurement, that the channel quality of the base station 2 is poor, and the terminal selects 16 narrow beams to send access signals.

The terminal has a multi-beam parallel sending capability, but the terminal cannot achieve omni-directional multi-beam parallel sending. Therefore, the terminal selects four access signal groups to send access signals, each access signal group including four access signals. The access signals of different access groups are sent in parallel, and different access signals in the group are sent on different access sub-frames.

The base station receives the access signals on the four access signal groups of the terminal 2, and sends an access response message at a corresponding position. Contents included in the response message are as shown in FIG. 15, identification for the access signals is included, and an access signal group index, an access signal intra-group index and an access signal quality indicator are included therein. The terminal is notified of a transmitting beam corresponding to the response message through the group index and the intra-group index, and a quality indicating message is used for notifying the terminal of the quality of an access signal corresponding to the transmitting beam.

The terminal receives the access response messages of the four groups, and sorts the transmitting beams according to the quality of accessed access signals. The base station and the terminal attempt combining a receiving beam and multiple transmitting beams within an access group continuing period, and the terminal acquires a preferable receiving beam within the present period.

The base station switches receiving beams within a next access period, receives an access signal sent by the terminal, and gives a response.

By means of multiple access signal periods, the terminal and the base station may select a preferable receiving beam and transmitting beam to be prepared for further beam correction or initial data transmission.

Example Four

A group of access signals corresponds to only one access response resource, and the response resource carries only one access response; a response message carries a quality indicating message; and a UE has a multi-beam parallel sending capability, but cannot achieve omni-directional multi-beam coverage.

The terminal has been connected to the base station 1, and the base station 1 notifies, through a high-layer signaling, the terminal of an access signal group for accessing the base station 2 and configuration information of an access response resource. The base station 1 notifies the terminal of 20 uplink access signal groups, and these groups can be used for accessing the base station 2. The access signal groups are distinguished through at least one dimension of a time domain, a frequency domain and a code domain.

As shown in FIG. 18, access continuing periods of these access signal groups namely BFx0, BFy0, BFx1, BFy1, BFx2, BFy2, BFx3, BFy3, BFx4, BFy4, BFx8, BFy8, BFx9 and BFy9 are five elementary time allocation units, each access continuing period including an access sub-frame. Access continuing periods of these groups namely BFx6, BFy6, BFx7 and BFy7 are 40 elementary time allocation units, each access continuing period including eight access sub-frames. Frequency domain bandwidths of these groups namely BFx0, BFy0, BFx1, BFy1, BFx2, BFy2, BFx3, BFy3, BFx4, BFy4, BFx8, BFy8, BFx9 and BFy9 are one elementary frequency domain unit, and frequency domain bandwidths of the other groups are two elementary frequency domain units. Multiple access signals of the same group are distinguished through a time order, and it is not defined whether different access signals in a group are identical access sequences.

The base station notifies resource configuration information of a corresponding access response through a control channel, as shown in FIG. 7. An access response resource position corresponding to an access signal group is not appointed or notified, so the terminal needs to continuously or frequently monitor the control channel and to acquire an access response position through the control channel after sending an access signal.

FIG. 12 shows a relationship among the base station 1, the base station 2 and the terminal. The base station 1 notifies, through a high-layer signaling, the terminal to switch beams within an access signal group continuing period to send access signals.

The terminal receives a notification message of the base station to identify a resource position of an access signal group for accessing the base station 2 and a form of sending an access signal.

The terminal measures a channel of the base station 2, determines that the channel condition is good according to a measurement result, and selects four narrow beams to send access signals.

The terminal has a multi-beam parallel sending capability. The terminal selects four access signal groups to send access signals, and each access sub-frame sends an access signal with different transmitting beams.

The base station receives the access signal at a resource position corresponding to the access signal group, determines two access signals in the access signal group BFx0 according to own processing resources and scheduling resources, and then sends a response. The same access response resource carries access response messages of two sub-frames, contents carried in access responses are as shown in FIG. 15, identification for the access signal is included, and an access signal group index, an access signal intra-group index and an access signal quality indicator are included therein, and are used for identifying the quality of different access signals.

The base station 2 receives the access signal at a resource position corresponding to the access signal group, and determines to feed a response message of each access signal group back according to own processing resources and scheduling resources. The same access response resource carries only one access response message. Contents carried in the access response are as shown in FIG. 15, identification for the access signal is included, and an access signal group index, an access signal intra-group index and an access signal quality indicator are included therein.

FIG. 23 shows a block diagram of an access processing system of a base station 2. An access signal group configuration unit selects an access signal group for the present base station or a certain cell in the base station, and the access signal group configuration unit configures whether the terminal performs beam switching in an access signal group period. An access response configuration unit determines an access response resource configuration corresponding to an access signal group of the present base station or a cell in the present base station according to an access signal group configuration condition of the present base station or the cell in the present base station. An access signal receiving unit receives an access signal at a corresponding position according to an access response configuration condition. A beam switching control unit determines whether to switch receiving beams within an access signal group continuing period according to the access signal group configuration unit. An access signal response unit sends an access response message at a corresponding resource position.

The terminal and the base station attempt combining a receiving beam and all transmitting beams within an access group continuing period, as shown in FIG. 17.

The terminal judges a preferable transmitting beam of this access group according to the received access response.

FIG. 10 shows an access processing system of a terminal. The terminal reads a broadcast message of the base station through a broadcast/signaling reading module to determine the configuration information of an access signal group and a corresponding access response resource, and the terminal reads a sending mode of an access signal within a continuing period through the broadcast/signaling reading module; a channel quality detection module determines the channel quality through a measurement channel; a transmitting beam identification module confirms the number of beams corresponding to different beam widths; an access signal group selection module selects an access signal group according to a comprehensive judgment on the access signal group configuration, the channel quality and the own beam capability of the terminal; an access signal transmitting module sends an access signal according to a resource corresponding to the access signal group selected by the access signal group selection module; an access response message receiving module receives an access response message at a corresponding position according to read access response configuration information; and a preferable link identification module selects a preferable link according to the received access response.

The base station switches receiving beams within a next access period, receives an access signal sent by the terminal, and gives a response.

By means of multiple access signal periods, the terminal and the base station may select a preferable receiving beam and transmitting beam to be prepared for further beam correction or initial data transmission.

In another embodiment, software is also provided. The software is configured to execute the technical solutions described in the above-mentioned embodiments and preferred implementation modes.

In another embodiment, a storage medium is also provided. The software is stored in the storage medium. The storage medium includes, but is not limited to, an optical disk, a floppy disk, a hard disk, an erasable memory and the like.

Obviously, a person skilled in the art shall understand that all of the above-mentioned modules or steps in the present disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to a combination of any specific hardware and software.

The above is only the preferable embodiments of the present disclosure, and not intended to limit the present disclosure. As will occur to a person skilled in the art, the present disclosure is susceptible to various modifications and changes. Any modifications, equivalent replacements, improvements and the like shall fall within the scope of protection of the present disclosure.

What is claimed is:

1. A method for processing a network access, comprising:
   acquiring resource configuration information of an access signal group, and the resource configuration information comprising: a sending resource required by a terminal for sending an access signal on a resource corresponding to the access signal group, and an access response resource corresponding to the access signal group; wherein the access signal being used for accessing a network, the access response resource being used for indicating a resource used by a sending device of the access signal when receiving a response signal for the access signal; and
   notifying the terminal of the resource configuration information;
   wherein the sending resource comprises a sending time resource, and the sending time resource comprises indicating information for indicating a duration time of the access signal group, and the indicating information comprises: a duration time and a duration time grade, wherein different duration time grades correspond to different duration times.

2. The method as claimed in claim 1, wherein the sending resource further comprises at least one of the following:
   a sending sequence and a sending frequency resource.

3. The method as claimed in claim 2, wherein the sending time resource further comprises at least one of the following:
   an initial position of the access signal group, a sending period of the access signal group.

4. The method as claimed in claim 2, wherein the sending frequency resource comprises: a frequency domain initial position and a frequency domain continuous bandwidth.

5. The method as claimed in claim 1, wherein the access response resource corresponding to the access signal group comprises at least one of the following:
   an access response resource corresponds to a sending resource of an access signal; and
   an access response resource corresponds to sending resources of a plurality of access signals.

6. The method as claimed in claim 5, wherein when sending resources of a plurality of access signals correspond to an access response resource,
   each access response resource corresponds to a sending resource of an access signal, or each access response resource corresponds to sending resources of a plurality of access signals.

7. The method as claimed in claim 6, when a plurality of access signal resources corresponds to an access response resource and each access response resource corresponds to sending resources of a plurality of access signals, network access quality indicating information is carried in response signals of the access signals.

8. The method as claimed in claim 1, wherein notifying the terminal of the resource configuration information comprises at least one of the following:

notifying, by a network node having been connected to the terminal, the terminal of the indicating information through a high-layer signaling;

broadcasting, by a network node to be accessed by the terminal, the resource configuration information through a broadcast channel;

notifying, by a specified terminal having been connected to the network, the terminal of the resource configuration information; and pre-configuring the terminal with the resource configuration information, the pre-configured resource configuration information being resource configuration information pre-appointed between a sender and a receiver of the access signal.

9. The method as claimed in claim 1, wherein the access response resource corresponding to the access signal group comprises one of the following:

sending, when receiving some access signals in an access signal group, an access response of the access signal group; and sending, when receiving all access signals in an access signal group, an access response of the access signal group.

10. The method as claimed in claim 1, wherein the sending resource comprises a mode of sending, by the terminal, an access signal on a resource corresponding to an access signal group, and the mode of sending an access signal comprising:

for the same access signal group, limiting the same the terminal to maintain a transmission direction in a process of sending an access signal in the access signal group, or limiting the terminal to switch different transmission directions in a process of sending an access signal in the access signal group.

11. The method as claimed in claim 10, wherein the duration time is an integral multiple of time needed by transmission of a data elementary unit.

12. The method as claimed in claim 10, wherein the duration time grades comprise 2n duration time grades, and n being an integer.

13. A network access method, comprising:

acquiring, by a terminal, resource configuration information of an access signal group, and the resource configuration information comprises: a sending resource required by the terminal for sending an access signal on a resource corresponding to the access signal group, and an access response resource corresponding to the access signal group; wherein the access signal being used for accessing a network, and the access response resource being used for indicating a resource occupied by a receiving device of the access signal when sending a response signal of the access signal; and selecting, by the terminal, the access signal group according to a preset rule, sending the access signal on a sending resource corresponding to the selected access signal group, and receiving, by the terminal, an access response message sent by an access network on an access response resource corresponding to the selected access signal group;

wherein the sending resource comprises a sending time resource, and the sending time resource comprises indicating information for indicating a duration time of the access signal group, and the indicating information comprises: a duration time and a duration time grade, wherein different duration time grades correspond to different duration times.

14. The method as claimed in claim 13, wherein selecting, by the terminal, the access signal group according to a preset rule comprises:

selecting, by the terminal, the access signal group according to measured channel quality and a beam capability of the terminal.

15. The method as claimed in claim 14, wherein selecting, by the terminal, the access signal group according to a measured channel condition and a beam capability of the terminal comprises:

when the channel quality is greater than a preset threshold, selecting, by the terminal, an access signal group containing few access signals;

when the channel quality is smaller than a preset threshold, selecting, by the terminal, an access signal group containing many access signals; and when the terminal has a multi-beam simultaneous transmitting capability, selecting, by the terminal, a plurality of access signal groups to be sent.

16. The method as claimed in claim 13, wherein the sending resource comprises a mode of sending, by the terminal, an access signal on a resource corresponding to an access signal group, and sending the access signal on a sending resource corresponding to the selected access signal group comprises: sending, by the terminal, the access signal according to a beam switching mode defined by the sending resource.

17. The method as claimed in claim 16, wherein the beam switching mode defined by the sending resource comprises:

for the same access signal group, limiting the terminal to maintain a transmission direction in a process of sending an access signal in the access signal group, or limiting the terminal to switch different transmission directions in a process of sending an access signal in the access signal group.

18. The method as claimed in claim 13, wherein acquiring, by a terminal, resource configuration information of an access signal group comprises one of the following:

receiving, by the terminal, a broadcast of a to-be-accessed node, and reading the resource configuration information in the broadcast;

acquiring, by the terminal, the resource configuration information from a high-layer signaling of a connected node;

acquiring, by the terminal, the resource configuration information from a notification message of a connected terminal; and acquiring, by the terminal, the resource configuration information from pre-configurations.

19. A device for processing a network access, comprising:

an acquisition module, configured to acquire resource configuration information of an access signal group, the resource configuration information comprising: a sending resource required by a terminal for sending an access signal on a resource corresponding to the access signal group, and an access response resource corresponding to the access signal group; wherein the access signal being used for accessing a network, and the access response resource being used for indicating a resource occupied by a receiving device of the access signal when sending a response signal of the access signal; and a notification module, configured to notify the terminal of the resource configuration information;

wherein the sending resource comprises a sending time resource, and the sending time resource comprises indicating information for indicating a duration time of the access signal group, and the indicating information comprises: a duration time and a duration time grade, wherein different duration time grades correspond to different duration times.

\* \* \* \* \*